United States Patent [19]

Paffrath et al.

[11] Patent Number: 5,150,959
[45] Date of Patent: Sep. 29, 1992

[54] COMBINATION SIDE MARKER, CLEARANCE AND REFLEX LAMP FOR A VEHICLE

[75] Inventors: Edgar C. Paffrath, Barrington, Ill.; Brian A. Hanson, Theresa, Wis.

[73] Assignee: Wesbar Corporation, West Bend, Wis.

[21] Appl. No.: 651,536

[22] Filed: Feb. 6, 1991

[51] Int. Cl.⁵ .............................................. B60Q 1/26
[52] U.S. Cl. ........................................ 362/80; 362/226; 362/267; 362/363; 362/368
[58] Field of Search ............... 362/61, 80, 267, 226, 362/294, 363, 368, 375, 374, 396

[56] References Cited

U.S. PATENT DOCUMENTS

| | | |
|---|---|---|
| 2,151,789 | 4/1939 | Bulter . |
| 3,032,646 | 5/1962 | Chieger . |
| 3,106,349 | 10/1963 | Bloodgood, Jr. : |
| 3,445,645 | 5/1969 | Newman . |
| 3,858,039 | 12/1974 | Moore ................... 240/8.3 |
| 4,281,367 | 7/1981 | Moore et al. ........... 362/96 |
| 4,293,847 | 10/1981 | McCarty ............... 362/267 X |
| 4,390,931 | 6/1983 | Gorick et al. ......... 362/267 |
| 4,506,314 | 3/1985 | Moore ................... 362/267 |
| 4,617,617 | 10/1986 | Cunningham et al. ... 362/267 |
| 5,060,121 | 10/1991 | Cunningham et al. ... 362/267 X |

Primary Examiner—Stephen F. Husar
Attorney, Agent, or Firm—Andrus, Sceales, Starke & Sawall

[57] ABSTRACT

A combination side marker, clearance and reflex lamp for a vehicle. The lamp includes a base which is adapted to be connected to a vehicle. The base is provided with a recess, and a lens in combination with the base define a bulb chamber that houses a light bulb. The base portion of the bulb extends through an opening in the base and into the recess. A pair of electrical conductors are mounted on the base and extend into the recess and are connected to the base portion of the bulb. A resin is potted in the recess to encapsulate the conductors and the base portion of the bulb. The bulb chamber is hermetically sealed to prevent contact of moisture or water with the bulb.

25 Claims, 3 Drawing Sheets

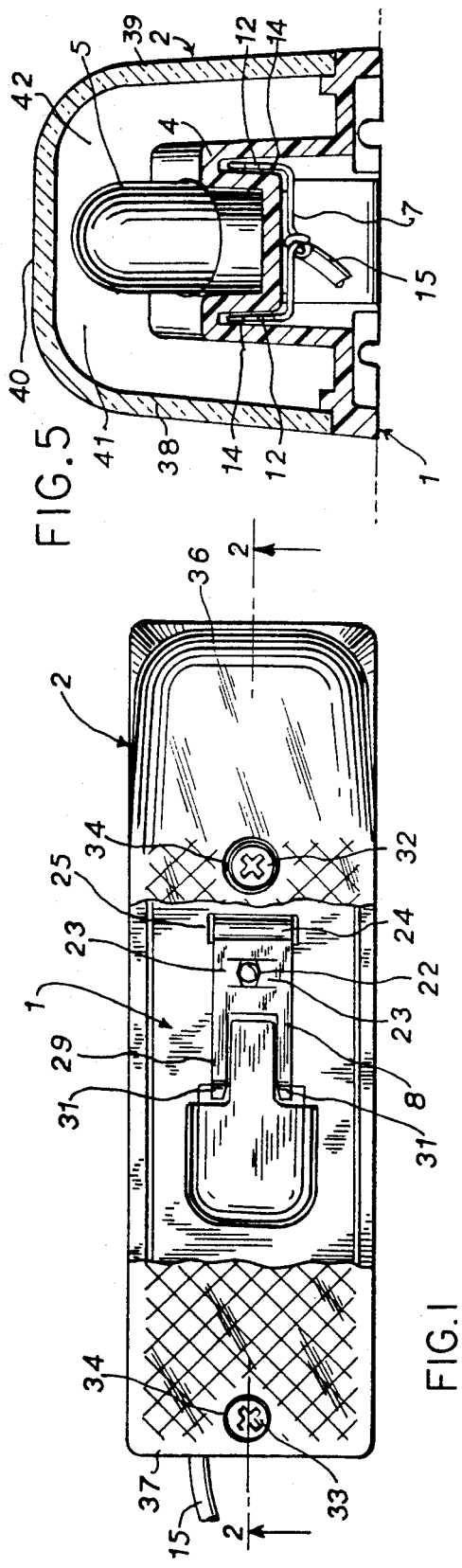
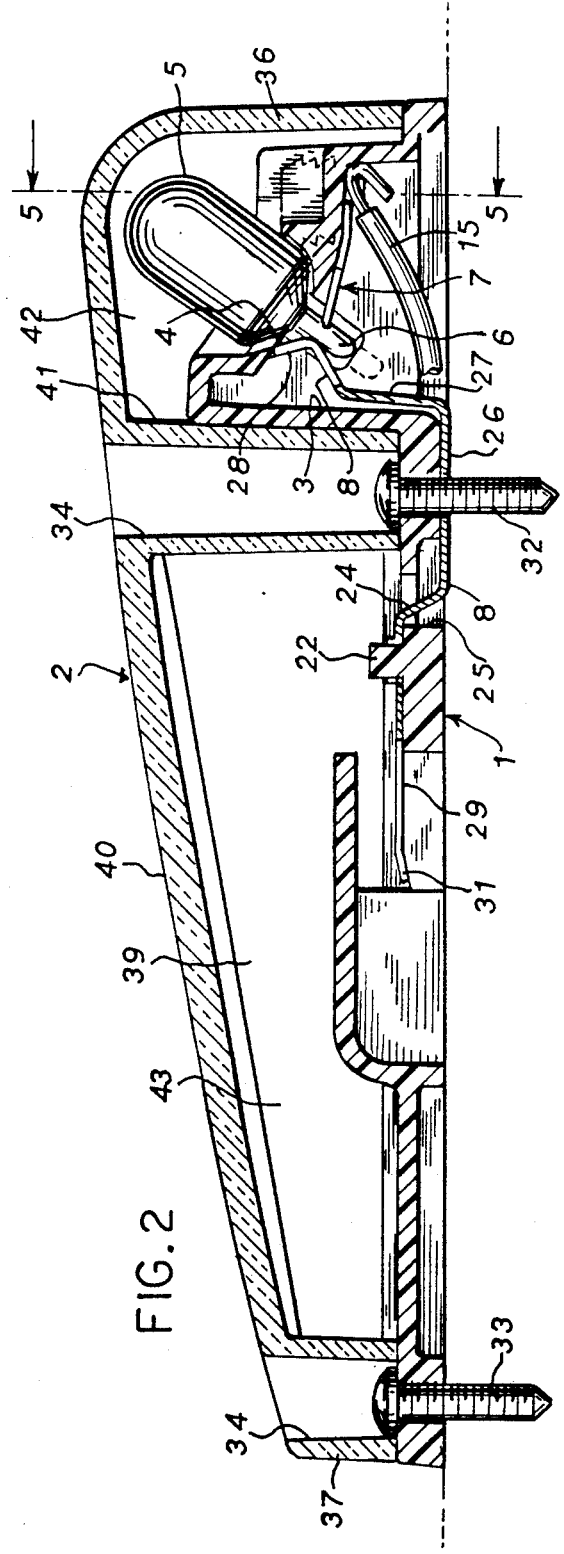

COMBINATION SIDE MARKER, CLEARANCE AND REFLEX LAMP FOR A VEHICLE

BACKGROUND OF THE INVENTION

Trailers and other vehicles more than 80 inches wide are required by regulation to have side marker, clearance and reflex lamps. In the past, all three of these functions have been incorporated in a single package utilizing only a single light bulb.

The typical side marker, clearance and reflex lamp is frequently exposed to water, moisture or salt spray which can cause corrosion of the electrical contacts and ultimate failure of the lamp. If the lamp is associated with a boat trailer, breakage of the light bulb may occur when the heated bulb is contacted by water during launching of the boat.

In an attempt to overcome the problem of corrosion and possible bulb breakage, boat trailer tail lights have been marketed in which the bulbs are contained within a sealed housing. The seal is accomplished by utilizing a resilient gasket between the lens and the housing. When the light bulb of the sealed tail light burns out and needs replacement, the replacement is normally done by the boat owner. As a result, the sealing gaskets are frequently not properly installed when the lenses are reassembled to the housing, and thus the sealed characteristics are destroyed.

Another approach as used in the past to prevent corrosion and bulb breakage of boat trailer tail lights, has been to design the tail lights on the air entrapment principle as disclosed in U.S. Pat. Nos. 3,106,349 and 3,858,038. With tail lights of this type, the upper end of the housing is sealed, while the lower end of the housing is provided with an opening through which the water can enter. As the water rises in the housing during the launching of the boat, air is entrapped in the upper end of the housing, preventing the water from rising to a level to contact the bulb or the electrical connections. However, constructions such as this are not totally satisfactory, in that water within the housing may be jostled as the trailer is moved over uneven terrain during launching, causing the water to splash against the bulbs and the connections, and moisture and salt spray can enter the housing during transporting.

A more recent attempt to prevent corrosion and bulb breakage in a boat trailer tail light has been to utilize a capsule which contains the bulb, as disclosed in U.S. Pat. No. 4,617,617. In a tail light of this type, the bulb is contained within a transparent capsule, and the lower end of the capsule is provided with a hole through which water can enter the capsule, but due to the closed upper end, the air will be entrapped in the upper end of the capsule to prevent the water from contacting the bulb.

SUMMARY OF THE INVENTION

The invention is directed to a combination side marker, clearance and reflex lamp for use with a vehicle such as a boat trailer.

In accordance with the invention, the lamp includes a base that is connected to the trailer or other vehicle, and the base is provided with a recess or well, the open end of which faces the vehicle.

An elongated lens is mounted on the base and a portion of the lens, in combination with the base, defines a bulb compartment that houses a light bulb. The electrically conductive base portion of the bulb extends through an opening in the base into the recess, and a pair of electrical conductors mounted on the base are connected to the base portion of the bulb. One of the conductors provides a connection between the bulb and a wire lead which, in turn, is connected to a power source, while the other of the conductors connects the bulb to ground through a fastener, such as a screw or bolt, that connects the lamp to the vehicle.

An electrically non-conductive material, such as a thermosetting resin, is potted in the recess in the base and encapsulates the conductors and the base portion ents. In addition, the peripheral edge of the lens is sealed to the base to hermetically seal the bulb chamber, so that water or moisture cannot contact the light bulb.

The invention provides a vehicle lamp which meets all of the side marker, clearance and reflex lighting requirements.

The lamp is designed so that the bulb, as well as the electrical connections to the bulb, are sealed to prevent contact with water or moisture, thus eliminating the problem of corrosion of the connections or breakage of the bulb during launching of a boat.

The lamp can be mounted to the vehicle either through screws or bolts, and the identical base can be used in both mounting arrangements.

As the electrical connections to the light bulb are potted by resin, a positive electrical connection is achieved which will not be loosened or destroyed by vibrational stress during service.

Other objects and advantages will appear during the course of the following description.

DESCRIPTION OF THE DRAWINGS

The drawings illustrate the best mode presently contemplated of carrying out the invention.

In the drawings:

FIG. 1 is a top plan view of the lamp of the invention with parts broken away;

FIG. 2 is longitudinal section taken along line 2—2 of FIG. 1;

FIG. 5 is a section taken along line 5—5 of FIG. 2;

DESCRIPTION OF THE ILLUSTRATED EMBODIMENT

Figure 3:
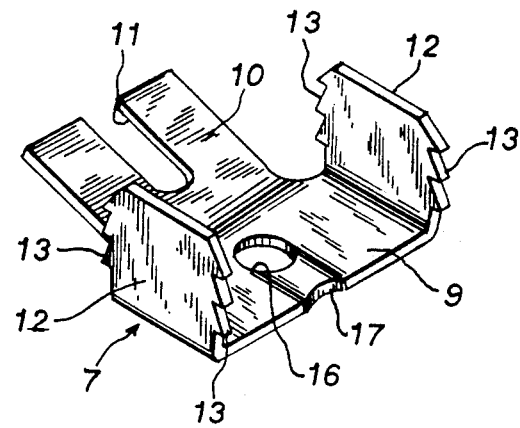
FIG. 3 is a perspective view of the electrical lead contact strip.

FIGS. 1-6 illustrate a combination side marker, clearance and reflex lamp for a vehicle having particular use with a boat trailer. The lamp is elongated in shape, and includes a base 1 and lens 2. Both the base and lens are preferably constructed of plastic material.

As best seen in FIG. 2, one end of base 1 is provided with a recess or well 3 and the portion of the base defining the bottom of recess 3 defines a seat 4 for a light bulb 5. Bulb 5 is a standard, wedge-base type in which the bulb contacts are located on the outer surface of base portion 6. Base portion 6 of the bulb extends through an opening in seat 4 and is electrically connected to a pair of conductor strips 7 and 8. Conductor strip 7 serves to connect the bulb through an electrical lead to a suitable power source, while conductor strip 8 connects the bulb to ground.

The configuration of conductor strip 7 is best illustrated in FIG. 3 and includes a generally flat body 9 and a flange 10 extends outwardly from the body at an angle thereto. Flange 10 is provided with an open-ended slot 11 which receives the base portion 6 of bulb 5.

As seen in FIG. 3, a pair of sides 12 extend outwardly from body 9 and the sides 12 are parallel to each other and extend generally normal to body 9. The edges of sides 12 are provided with serrations or barbs 13.

Conductor strip 7 is press fitted to the recess 3 of base 1. As seen in FIG. 5, the recess 3 is provided with a pair of parallel spaced pockets 14 which receive the sides 12 of conductor strip 7. Barbs 13 engage the walls bordering pockets 14 to prevent the strip from being accidentally disengaged from the pockets.

A lead wire 15 is connected to body 9 and the bare end of the wire extends through a hole 16 in body 9, and is then bent back through notch 17.

Figure 6:
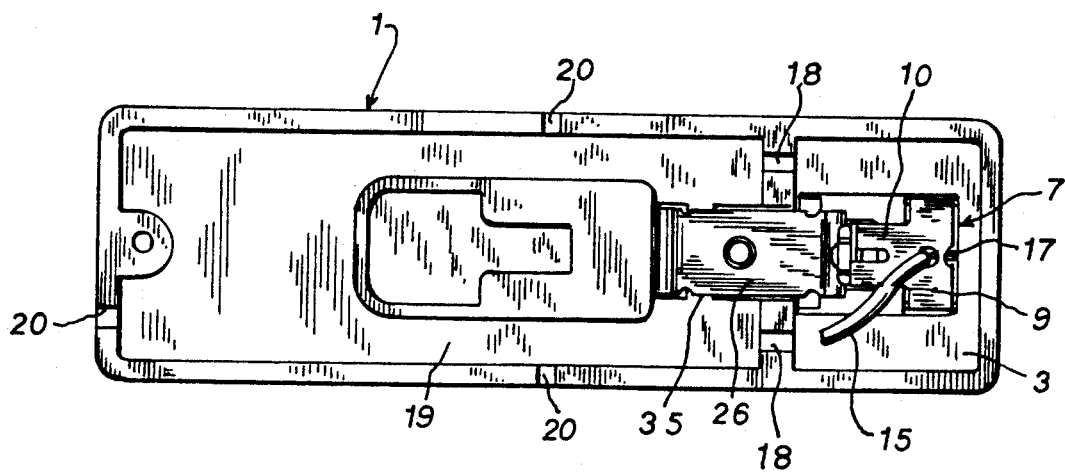
FIG. 6 is a bottom view of the base.

As seen n FIG. 6, the under surface of base 1 is formed with a pair of slots 18 which provide communication between recess 3 and a shallow depression 19 in the base. A series of notches connect depression 19 with the exterior. The lead wire 15 passes through one of the slots to recess 19 and then exits through one of the notches 20. By having a pair of slots 18 and a group of notches 20 in different locations, it enables the lamp to be conveniently mounted in various positions to the vehicle.

Figure 4:
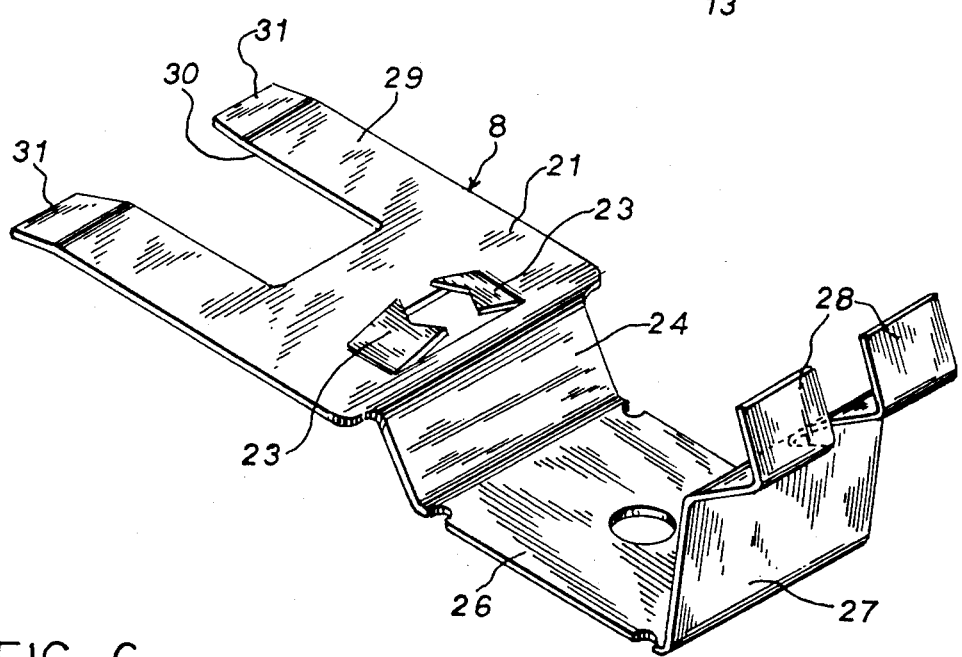
FIG. 4 is perspective view of the ground contact strip.

The ground conductor strip 8 is best illustrated in FIG. 4 and includes a central section 21 which is mounted flat-wise against the upper surface of base 1, and is retained in position by engagement of a post 22 with a pair of flexible spaced tabs 23 which border an opening in the conductor strip 8.

A diagonal section 24 extends downwardly from central section 21 and passes through an opening 25 in base 1. Diagonal section 24 merges into a section 26 which is parallel to section 21 and extends along the underside of base 1. The opposite end of section 26 is connected to a vertical section 27 which terminates in a pair of spaced tabs 28 that border an open-ended slot that is adapted to receive the base portion 6 of the bulb. Flange 10 of conductor strip 7 and tabs 28 of conductor strip 8 are flexible and are spread apart as the base portion 6 of the bulb is inserted therebetween. The flexible nature of the flange 10 and tabs 28 will provide a biasing force to maintain the conductors in contact with the base portion 6 of bulb 5.

The opposite end 29 of central section 21 is bifurcated, and is provided with an open-ended slot 30 which is adapted to receive the stem of a connecting bolt as will be hereinafter described in connection with the embodiment of FIGS. 7-9. The extremities of the bifurcated end 29 are sloped downwardly, as shown by 31.

The lamp construction of FIGS. 1-6 is adapted to be connected to the vehicle by means of a pair of screws 32 and 33. One screw 32 extends through aligned openings in ground conductor strip 8 and base 1, while the other screw 33 extends through an opening in the end of the base. The heads of screws 32 and 33 are located within generally cylindrical wells 34 in lens 2, as illustrated in FIG. 2. Screws 32 and 33 do not function to connect the lens to the base, for the peripheral edge of the lens is heat sealed or welded to the base, as will be hereinafter described. As lens 2 is normally formed of a more brittle plastic material than base 1, the heads of screws 32 and 33 are not in bearing engagement with the lens, and as such, tightening down of the screws will not stress the lens material.

The section 26 of conductor strip 8 extends within a recess or channel 35 in the lower surface of base 1. The thickness of the conductor strip 8 is greater than the depth of the recess 35, so that the conductor strip 8 will project beyond the under surface of the base, thus ensuring a positive contact with the vehicle.

Lens 2 is composed of a pair of end walls 36 and 37, a pair of side walls 38 and 39, and a top wall 40. As best seen in FIG. 2, top wall 40 slopes downwardly from end wall 36 to end wall 37, and the outer surface of top wall 40 is slightly convex. The top wall 40 and end wall 36 are connected along a radiused corner, as seen in FIG. 2.

Lens 2 is also provided with a transverse wall 41 which connects the side walls 38, and transverse wall 41, top wall 40, side walls 38 and 39 and end wall 36 define a bulb compartment 42 which houses the light bulb 5, as shown in FIG. 2. The axis of bulb 5 is at an angle of about 45° with respect to the plane of base 1, and as the lens 2 is formed of transparent material, the light from bulb 5 will meet both the side marker and clearance requirements.

The opposite end portion of lens 2 is spaced from base 1 and defines a second compartment or chamber 43. The inner surface of top wall 40 bordering chamber 43 is formed with a reflex pattern which will meet the reflex requirements.

The well or recess 3 is potted with an electrically insulating material 44, such as a thermosetting resin (not shown in the drawings for clarity), which serves to encapsulate the portions of the conductors 7 and 8 located in the recess, as well as the base portion 6 of the bulb, thus preventing exposure of these components to water or moisture.

In addition, the peripheral edge of lens 2 bordering the bulb chamber 42 is hermetically sealed to base 1, thereby preventing water or moisture from entering the bulb chamber and contacting the bulb 5. The seal is preferably accomplished by ultrasonic welding or heat sealing of the plastic materials. In addition, a series of spot welds or heat seals can connect the remaining portion of the peripheral edge of the lens, outside of the bulb compartment 42, to the base 1

Figure 9:
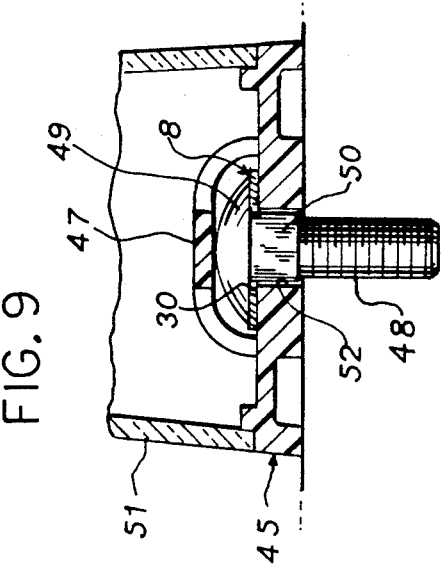
FIG. 9 is a transverse section taken along 9—9 of FIG. 8.
Figure 7:
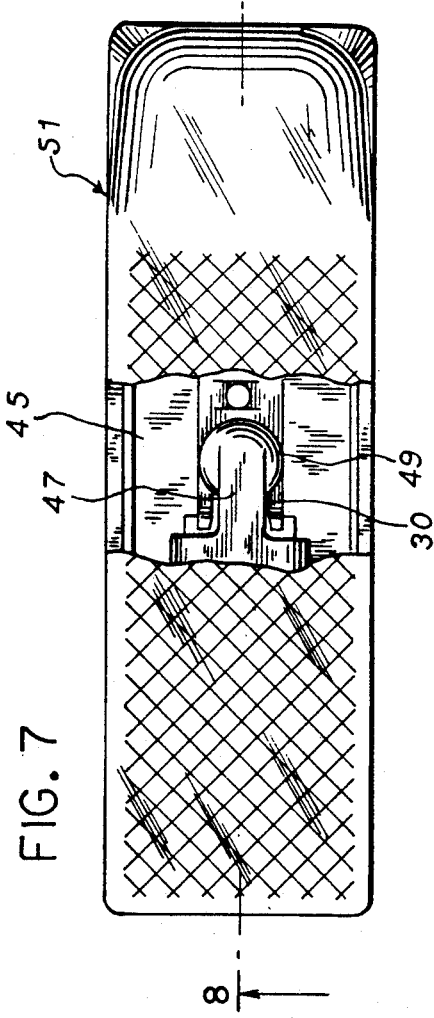
FIG. 7 is a top plan view of a modified form of the invention with parts broken away.
Figure 8:
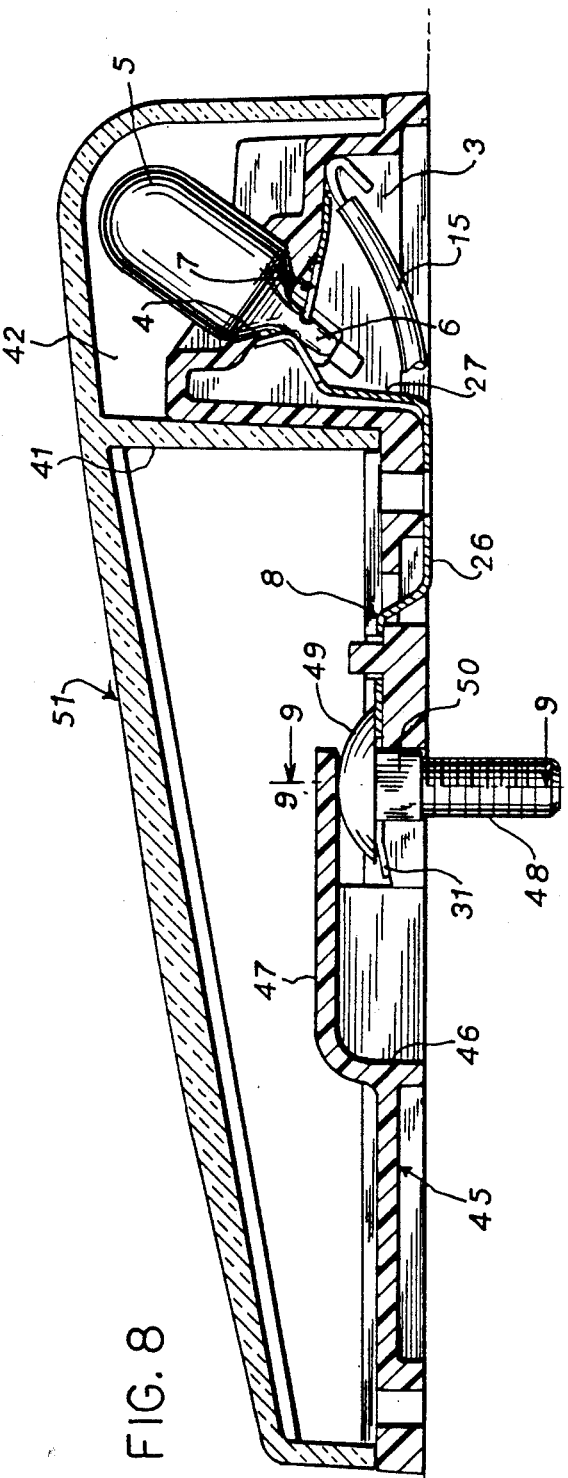
FIG. 8 is a longitudinal section taken along line 8—8 of FIG. 7.

FIGS. 7-9 illustrate a modified form of the invention, using a stud mount to the vehicle. The base 45 is identical to base 1 of the first embodiment and, as shown in FIG. 8, the base includes a central opening 46 and a backing member 47, which is located inwardly of opening 46. A carriage bolt 48 is employed to secure the lamp to a vehicle, and the head 49 of the bolt is inserted into the opening 46. The bolt is then slid in a direction toward the bulb 5 so that the square shank 50 of the bolt is received within the slot 30 of the ground conductor strip 8. The sloping ends 31 on the conductor strip 8 aid in moving the head 49 of the bolt 48 into the space between the conductor strip 8 and the backing member 47, as shown in FIG. 8. Rotation of the bolt is prevented by engagement of the square shank 50 with the slot 30 and slot 52 in the base 1. Axial movement of the bolt, as a nut is threaded on the bolt stem, is prevented by engagement of the head 49 of the bolt with the backing member 47.

A lens 51 is welded to the base in the manner described with respect to the first embodiment. The lens 51 is similar in configuration to lens 2, except that it does not contain the wells 34 for the screws, as in the first embodiment.

The invention provides a combination side marker, clearance and reflex lamp in a single package. As the bulb and the electrical connections to the bulb are sealed, there is no possibility of water or moisture contacting these components, thus corrosion of these components is prevented and the service life of the lamp is substantially increased.

The identical base 1 can be used for both stud and screw mounting, and this provides a cost reduction in molding, as well as reducing inventory costs.

If the lens is provided with an amber color it can be used at the front of the vehicle, while if the lens is red in color it can be used at the rear of the vehicle. In addition, the construction permits the lamp to be mounted in either a horizontal or vertical position, and in either case, the lamp will meet all the side marker, clearance and reflex requirements.

Various modes of carrying out the invention are contemplated as being within the scope of the following claims particularly pointing out and distinctly claiming the subject matter which is regarded as the invention.

We claim:

1. A combination side marker, clearance and reflex lamp for a vehicle, comprising a base, connecting means for connecting the base to a vehicle, an outer surface of said base having an inwardly extending portion defining a recess, a lens mounted on the base and defining in combination with said base a bulb compartment, the inwardly extending portion of the base having an opening connecting the bulb compartment and the recess, a bulb disposed in the bulb compartment and having an electrically conductive base portion, said base portion extending through said opening and into said recess, sealing means for hermetically sealing said bulb compartment, and a plurality of electrical conductors mounted on the base and extending into said recess and connected to said bulb base portion.

2. The lamp of claim 1, and including a mass of resin disposed in said recess and encapsulating said conductors and said base portion.

3. The lamp of claim 1, wherein said connecting means comprises a hole in said base and a fastener extending through said hole and adapted to be connected to said vehicle.

4. The lamp of claim 1, wherein said connecting means comprises an aperture in said base, and a bolt extending through said aperture and adapted to be connected to said vehicle.

5. The lamp of claim 4, wherein said bolt is provided with a head and a stem, said head being receivable within said aperture and one of said conductors having an open ended slot to receive the stem of said bolt.

6. The lamp of claim 5, and including means for preventing rotation of the bolt stem in said slot.

7. The lamp of claim 6, and including means for preventing axial movement of said bolt relative to said base.

8. The lamp of claim 7, wherein said means for preventing axial movement of said bolt comprises a backing member spaced inwardly of said slot and disposed to engage the head of said bolt.

9. The lamp of claim 1, wherein said connecting means comprises a hole in said base to receive a screw and said connecting means further includes an aperture in said base to also receive a bolt.

10. A combination side marker, clearance and reflex light for a vehicle, comprising a base having a first surface disposed to be connected to a vehicle and having an opposed second surface, said first surface having a depressed portion defining a recess, a lens mounted on said base, said lens in combination with said second surface defining a bulb compartment, said depressed portion having an opening establishing communication between said compartment and said recess, a bulb disposed in the bulb compartment and having an electrically conductive base portion extending through said opening and into said recess, sealing means for hermetically sealing said bulb compartment, a plurality of electrical conductors mounted on the base and extending into said recess and connected to said bulb base portion, and a mass of resin disposed in said recess and encapsulating said electrical conductors and the base portion of said bulb.

11. The lamp of claim 10, wherein said base and said lens are formed of plastic material and said sealing means comprises a heat seal connecting the peripheral edge of the lens to said base.

12. The lamp of claim 10, wherein said lens in combination with said base define a second compartment spaced from said first compartment.

13. The lamp of claim 12, wherein a first of said conductors extends from said second compartment to said recess, and connecting means for connecting said first conductor to said vehicle.

14. The lamp of claim 10, wherein the first surface of said base is provided with a channel, an electrical lead disposed in said channel and extending into said recess and connected to one of said conductors.

15. The lamp of claim 14, and including attaching means for attaching a second of said conductors to the base.

16. The lamp of claim 15, wherein said attaching means comprises an elongated pocket disposed in the base, and a thin element on said second conductor and press fitted within said pocket.

17. The lamp of claim 16, and including a plurality of barbs on said element and engagable with the portion of the base bordering said pocket.

18. The lamp of claim 15, wherein said attaching means comprises a pair of generally parallel elongated pockets, and a pair of thin elements disposed on said second conductor and press fitted within the respective pockets.

19. A combination side marker, clearance and reflex lamp for a vehicle, comprising a base having a first surface to be attached to a vehicle and having an opposed second surface, a recess disposed in said first surface, a portion of said base bordering said recess defining a bulb seat, an elongated lens mounted on the base, said lens and said base in combination defining a bulb compartment, said portion of the base having an opening connecting said bulb compartment and said recess, a bulb disposed in the bulb compartment and engaged with said seat, said bulb having an electrically conductive base portion extending through said opening and into said recess, sealing means for hermetically sealing said bulb compartment, a first conductor attached to the base and extending into said recess and engaged with the base portion of said bulb, a second conductor attached to the base and disposed in said recess and engaged with said base portion of the bulb, an electrical lead connected to said second conductor and extending to the exterior of said base, and a mass of electrically insulating material disposed in said recess and encapsulating the base portion of said bulb and the connections of said base portion to said first conductor and said second conductor.

20. The lamp of claim 19, wherein said first and second conductors are each provided with flexible terminal sections engaged with the base portion of the bulb.

21. The lamp of claim 19, wherein the lens and the base in combination define a second chamber separate from said first chamber, and light reflex means on the lens and disposed in said second compartment.

22. The lamp of claim 19, wherein said lens is provided with a pair of end walls and a pair of side walls and a top wall and said lens has an open bottom bordered by a peripheral edge, said peripheral edge engaged with the second surface of said base.

23. The lamp of claim 22, wherein the portions of said top wall, said side walls and one of said end walls bordering the bulb chamber are transparent.

24. The lamp of claim 23, wherein the top wall slopes inwardly from said first end wall toward the second of said end walls.

25. The lamp of claim 21, and including connecting means disposed in said second compartment for connecting the base to a vehicle.

* * * * *